United States Patent [19]
Hess et al.

[11] 3,876,538
[45] Apr. 8, 1975

[54] PROCESS FOR DISPOSING OF AQUEOUS SEWAGE AND PRODUCING FRESH WATER

[75] Inventors: Howard V. Hess, Glenham; William F. Franz, Gardiner; Edward L. Cole, Fishkill, all of N.Y.

[73] Assignee: Texaco, Inc., New York, N.Y.

[22] Filed: Nov. 6, 1972

[21] Appl. No.: 304,160

[52] U.S. Cl. .................. 210/21; 210/63; 210/71; 210/73; 210/83; 210/175; 210/513; 201/25
[51] Int. Cl. ............................................. B01d 11/00
[58] Field of Search .................... 210/21, 22, 63

[56] References Cited
UNITED STATES PATENTS

| | | | |
|---|---|---|---|
| 3,308,063 | 3/1967 | Hess et al. | 210/21 |
| 3,591,449 | 7/1971 | Hess et al. | 210/63 |
| 3,607,619 | 9/1971 | Hess et al. | 210/63 |

OTHER PUBLICATIONS
Proposal for Design, Development, Construction and Test of an Operational Prototype, 10–20, Man Waste Treatment System Suitable for Shipboard Use, Vol. II of III, P. 1–16, Fig. 2, Philco-Ford Corp., Aeronautic Division.

*Primary Examiner*—Samih N. Zaharna
*Assistant Examiner*—Ferris H. Lander
*Attorney, Agent, or Firm*—Thomas H. Whaley; Carl G. Ries

[57] ABSTRACT

Disclosed is a process for disposing of aqueous sewage and for producing fresh water by coking the sewage in the liquid phase to form gases, coke and an effluent which is extracted with a hot liquid hydrogen to form a hydrocarbon-water solution and a concentrated brine. Cooling of the hydrocarbon-water solution results in the formation of distinct hydrocarbon and water phases which can be separated by gravity.

8 Claims, 1 Drawing Figure

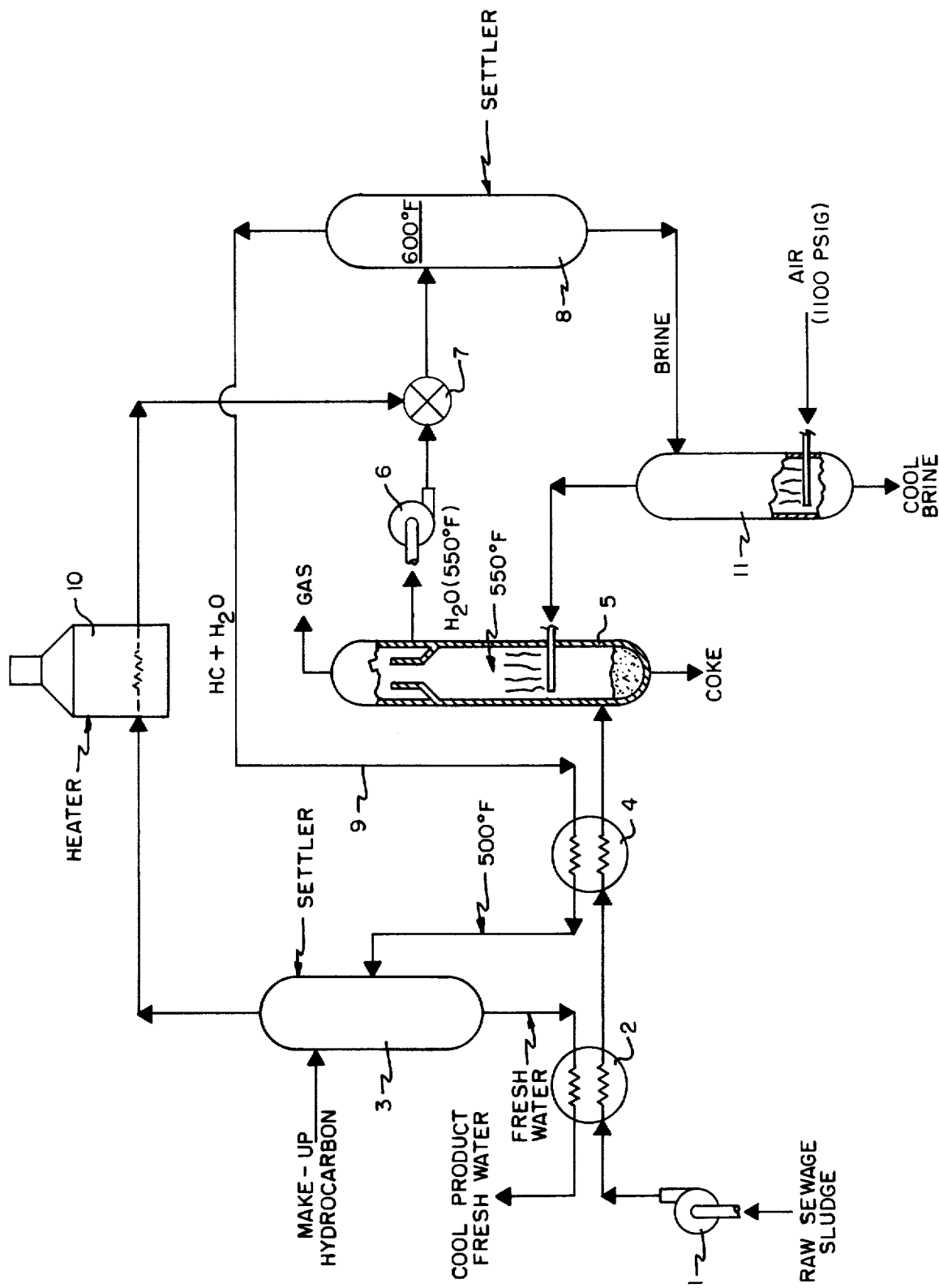

PROCESS FOR DISPOSING OF AQUEOUS SEWAGE AND PRODUCING FRESH WATER

The present invention relates to a novel process for treating aqueous sewage and sewage sludges to produce fresh water. This process is particularly applicable to the recovery of salt-free water from waste waters and to the production of coke from such waters.

The present invention involves coking sewage or sewage sludges in the liquid phase in the absence of added free oxygen under a pressure of 300 to 3500 psi at a temperature of 400° to 700°F for 0.5 minutes to 6 hours to form gases, coke and an effluent having a reduced COD and BOD as compared with that of the charge. The effluent is oxidized with $O_2$ to further reduce its COD and BOD and contacted with a hot hydrocarbon liquid characterized by its ability to extract a greater amount of water at a high temperature than at a lower temperature. This contact results in a substantial amount of the water dissolving in the hot hydrocarbon and in the production of a concentrated "brine" phase containing dissolved inorganic salts which are physically separated. The hot hydrocarbon-water solution is cooled by an amount sufficient to produce a water phase and a hydrocarbon phase which are separated by gravity.

As used herein, the term "brine" denotes solutions of water soluble inorganic compounds in water such as aqueous solutions of dissolved mineral salts, for example, halides, carbonates, phosphates and sulfates of sodium, potassium, lithium, calcium, magnesium, zinc copper and mixtures of these in various concentrations.

Normally liquid hydrocarbons are generally suitable for use in the process of this invention. In particular, hydrocarbons and mixtues thereof having from 5 to 30 carbon atoms per molecule may be used with hydrocarbons having from 6 to 12 carbons being preferred. Various petroleum fractions including kerosene, naphtha, odorless spirits, gasoline and lubricating oils can be used in the process. Preferred petroleum fractions include isoparaffin hydrocarbons of 12 carbon atoms per molecule, e.g. the bottoms fraction obtained by alkylation of butylenes with isobutane; Udex extract consisting of hydrocarbons of 9 to 10 carbon atoms per molecule obtained by extraction of catalytically reformed petroleum naphtha with a mixture of di-ethylene glycol and water; propylene tetramer; gasoline fractions of 10 to 12 carbon atoms per molecule and naphthenes containing 9 to 10 carbon atoms per molecule. If the water recovered is to be used for domestic purposes, the hydrocarbon used should have a low toxicity and low solubility in water at ordinary temperatures and atmospheric pressure. Generally, saturated hydrocarbons are preferred for the production of potable water.

The present inventive concept will be more readily understood upon consideration of the accompanying drawing which is a flow diagram of one arrangement for carrying out the process of this invention.

Referring to the drawing, raw sewage sludge is pumped to coking pressure (of around 1,100 psig) by pump 1 through heat exchanger 2 where it is heated with hot fresh water from settler 3. The hot fresh water is cooled and is one product of the process. The partially heated sewage sludge then passes through heat exchanger 4 where it is heated to coking temperature (400° to 700°F) by the hot hydrocarbon-water solution coming from settler 8 through line 9. In heat exchanger 4 the hot hydrocarbon-water solution is cooled to about 500°F. to produce water and hydrocarbon phases in settler 3. The hot water, as previously mentioned passes through heat exchanger 2 where it is cooled to produce product fresh water. The hot sewage sludge (now at coking temperature) passes to vessel 5 the bottom of which serves as a coke drum and settler and the coke produced settles to the bottom from which it may be removed as a second product. The upper liquid phase in vessel 5 is contacted with hot air at pressure and temperatures to oxidize the remaining COD and BOD not removed by the coking reaction. The gases produced in the coking reaction (largely $CO_2$) and the products from oxidation (with air) of the residual COD and BOD (largely $N_2$ and $CO_2$) are vented to the atmosphere from the top of vessel 5. Water from vessel 5, now having a very low BOD and COD but still containing dissolved salts is pumped by pump 6 up to extraction pressure, 1,000 to 3,000 psi, preferably 2,000 psi, and mixed by direct co-current contact with hot hydrocarbon at about 650°F. at mix valve 7 and heated by direct exchange to about 600°F. but below the temperature at which vaporization can occur in the system. At 600°F. a large fraction of the water dissolves in the hydrocarbon and a concentrated brine phase is produced containing dissolved inorganic salts. The hot hydrocarbon-water solution and the hot brine are separated in settler 8. The hot hydrocarbon-water solution passes through line 9 and heat exchanger 4 where it is cooled to about 500°F. to produce a hot hydrocarbon phase and a hot fresh water phase which are separated in settler 3. The hot hydrocarbon from settler 3 at about 500°F. passes through heater 10 where it is heated to about 650°F. and is passed again to mix valve and direct heat exchanger 7 for further water extraction. Hot brine from settler 8 passes to direct heat exchange tower 11 where it is used to heat compressed air which is used as shown in vessel 5. Cool brine is rejected from vessel 11.

For optimum efficiency, the present process should be operated at temperatures above 500°F. for the extraction step, after which the temperature is reduced below the extraction temperature to effect the formation of separate water and hydrocarbon liquid phases and usually by at least 50°F. below the extraction temperature. When using aliphatic hydrocarbons optimum extraction efficiency is obtained at a temperature above about 600°F.

The coke product from vessel 5 may be activated and used for a final clean up to produce potable water. Alternatively, the coke product may be used as fuel in heater 10 or disposed of as land fill or soil conditioners. Where necessary, conventional chemicals may be added to the fresh water to render it more potable.

What is claimed is:

1. In combination in an aqueous sewage treatment process, the steps of:

coking said sewage in the liquid phase in the absence of added free oxygen to form gases, coke and a hot aqueous effluent containing dissolved inorganic salts; air oxidizing said effluent to further reduce the COD and BOD thereof; flowing said effluent to a water extraction zone; contacting said effluent with a hydrocarbon heated to above 500°F. at a pressure such as to maintain at least a part of said hydrocarbon effluent mixture in the liquid phase such that a substantial amount of the water in said effluent dissolves in said hydrocarbon thereby forming a hot hydrocarbon-water solution and a concentrated brine; separating said solution from said brine, cooling said solution to a temperature such as to effect the formation of separate fresh water, and hydrocarbon phases; and separating said phases.

2. The process of claim 1 wherein said solution is cooled by heat exchange with incoming sludge.

3. The process of claim 1 wherein said hydrocarbon phase is reheated to between 600°F. and 750°F. and recycled to the said water extraction zone.

4. Process according to claim 1 wherein said coke is activated and brought into contact with the separated water phase to further purify same.

5. Process according to claim 1 wherein said coke is burned to heat said hydrocarbon.

6. Process according to claim 1 further including the steps of cooling said hot hydrocarbon-water solution by heat exchange with said aqueous sewage.

7. Process according to claim 1 wherein said brine is flowed to a heat exchange zone, and cooled by direct contact with compressed air.

8. Process according to claim 7 wherein said compressed air, is heated and used to oxidize said effluent.

* * * * *